United States Patent
Schmiege et al.

[15] 3,670,138
[45] June 13, 1972

[54] WELDING EQUIPMENT

[72] Inventors: Lester C. Schmiege; Wendell C. Zeluff, both of Kalamazoo, Mich.

[73] Assignee: American Wire Cloth Company, Parchment, Mich.

[22] Filed: Dec. 7, 1970

[21] Appl. No.: 95,828

Related U.S. Application Data

[63] Continuation-in-part of Ser. No. 722,326, April 18, 1968, Pat. No. 3,553,416.

[52] U.S. Cl. ............................................ 219/114, 219/110
[51] Int. Cl. ........................................................ B23k 9/10
[58] Field of Search .................................. 219/114, 108–110

[56] References Cited

UNITED STATES PATENTS

| | | | |
|---|---|---|---|
| 3,398,255 | 10/1968 | Aldenhoff | 219/116 X |
| 3,431,388 | 3/1969 | Hamilton | 219/86 |
| 3,378,696 | 4/1968 | Eckl et al. | 219/108 X |
| 2,996,604 | 8/1961 | Lemson et al. | 219/110 |
| 3,518,395 | 6/1970 | Vanderhelst | 219/110 |

*Primary Examiner*—J. V. Truhe
*Assistant Examiner*—L. A. Schutzman
*Attorney*—Woodhams, Blanchard and Flynn

[57] ABSTRACT

A welding apparatus including a pair of electrodes connected by elongated electrical conductors to a transformer and a circuit for controlling the duration and strength of the welding current. One electrode is mounted upon a handle containing a normally open switch which is closed when said one electrode is pressed against an object. Closure of said switch initiates a current flow which is accurately terminated after a predetermined period of time controlled by the circuit.

5 Claims, 4 Drawing Figures

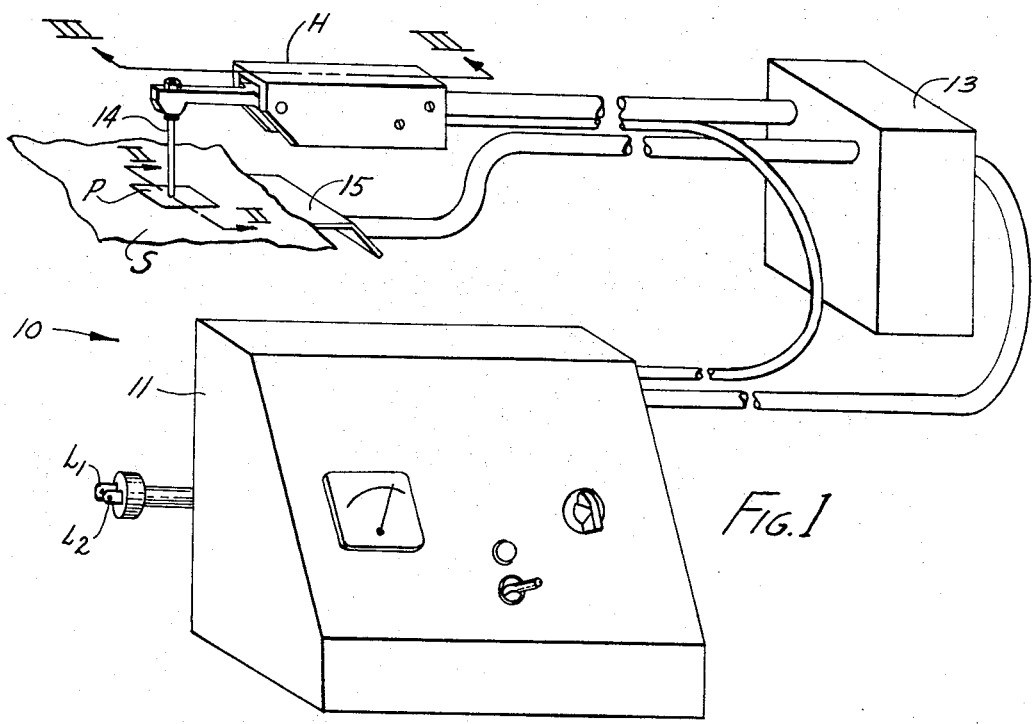
FIG. 1
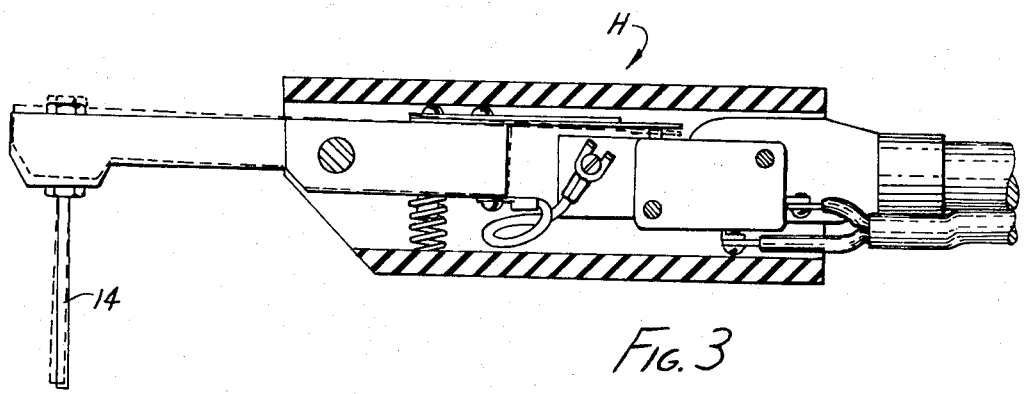
FIG. 3
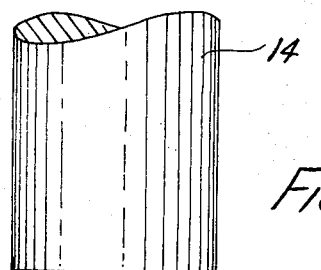
FIG. 2
INVENTORS
LESTER C. SCHMIEGE
WENDELL C. ZELUFF
BY
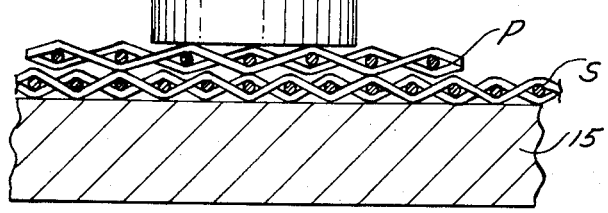
ATTORNEYS

INVENTORS
LESTER C. SCHMIEGE
WENDELL C. ZELUFF

BY Woodhams, Blanchard & Flynn
ATTORNEYS

WELDING EQUIPMENT

CROSS-REFERENCE TO RELATED APPLICATION

This application is a continuation-in-part of copending U.S. application Ser. No. 722,326, filed Apr. 18, 1968, by the present applicants, now U.S. Pat. No. 3,553,416, issued on Jan. 5, 1971.

BACKGROUND OF THE INVENTION

This invention relates in general to a welding apparatus and, more particularly, to a type thereof which is capable of firmly securing small patches or pieces of wire mesh screening to large sheets of such screening in order to repair holes or tears in such sheets without materially impeding the free flow of liquid through the patch portion of the sheet.

Persons acquainted with the use and maintenance of fine mesh wire screen, such as that commonly referred to as Fourdrinier screen and used in the manufacture of paper, have long been aware of the problems encountered in attempting to repair such screen. In the first place, Fourdrinier screen, which is specifically mentioned herein for illustrative purposes, is fabricated from relatively fine wire and the openings between the wires must be very small in order to minimize the escape of the fibers used in forming a sheet of paper. Thus, any method and means of patching the Fourdrinier screen must, in order to be completely acceptable, avoid a substantial reduction in the openings through the screen as the result of the repairing thereof. Heretofore, repair methods involving a welding operation required highly skilled operators and have many times resulted in damage to the screen in the region of the patch whereby the efficiency of the screen to pass liquids is greatly reduced. Moreover, the problem of burning the Fourdrinier screen during attempted repairs frequently increased the amount of the damaged area.

Accordingly, a primary object of this invention is the provision of a welding apparatus whereby a fine mesh wire screen patch can be firmly and permanently attached to a relatively larger sheet of fine mesh wire screen capable of conducting electricity without significantly increasing resistance to the flow of liquids through the patched area, by comparison with the unpatched areas, without materially decreasing the flexibility of the patch area and without increasing the damage or potential damage to the patched area.

A further object of the invention is the provision of a device, as aforesaid, in which the patch is applied by an electric welding operation capable of adjustment and adaptation to screens of different types and sizes and in which both the period of flow and amount of welding current can be accurately controlled and adjusted according to the conductivity of the wire mesh involved.

A further object of the invention is the provision of improved circuitry of the solid state type capable of reliable operation over long periods of use under disadvantageous conditions and having low and readily met internal power requirements.

A further object of the invention is the provision of circuitry for preventing welding if the electrode resistance is excessivly high and to facilitate set-up of the circuitry for use.

Other objects and purposes of this invention will become apparent to persons familiar with welding equipment upon reading the following descriptive material and examining the accompanying drawings, in which:

FIG. 1 is a broken, perspective view of a welding apparatus embodying the invention.

FIG. 2 is an enlarged sectional view taken along the line II—II in FIG. 1.

FIG. 3 is an enlarged sectional view taken along the line III—III in FIG. 1.

SUMMARY OF THE INVENTION

Figure 4:
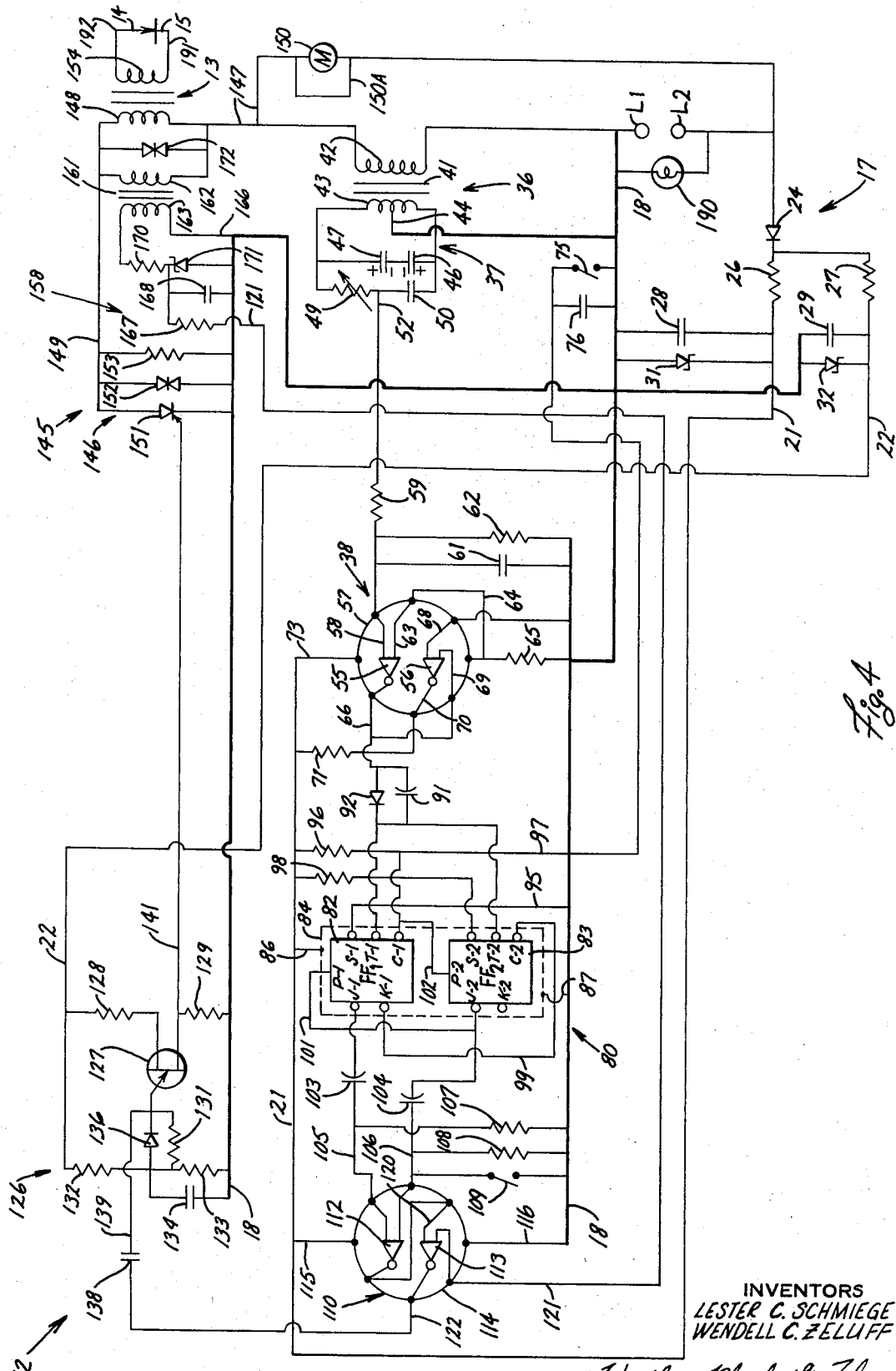
FIG. 4 is a schematic diagram of the control and power circuits for the welding electrodes.

The welding apparatus embodying the invention comprises a pair of electrodes adapted for disposition on opposite sides of a sheet and on adjacent patches of wire screen material to be welded together. One of the electrodes is pivotally mounted on a handle in proximity to a switch for actuating said switch when urged against the workpiece. The switch when actuated enables a control circuit to energize a welding transformer across which the electrodes are connected. The control circuit includes a clock pulse generator for producing a train of clock pulses occurring at a preselected point in each of successive cycles of an alternating current source. A bistable unit responds to coincidence of clock pulses and a closed condition of the switch to produce a limited number of pulses. A unijunction trigger circuit responds to said pulses for actuating an SCR firing circuit, upon occurrence of each said pulse, for applying weld current to the sheet and patch of screen material for a period corresponding to the remainder of a half cycle of the alternating current source. A lock-out circuit prevents actuation of the trigger circuit when the weld contact resistance is excessive, i.e., when weld electrodes are not held against the screen and patch with sufficient pressure.

DETAILED DESCRIPTION

The welding apparatus 10 (FIG. 1) comprises a cabinet structure 11 for housing electrical circuitry 12 (FIG. 4), a housing containing a welding transformer 13 and a pair of welding electrodes 14 and 15. As shown in FIG. 1, electrodes 14 and 15 are intended to be placed on opposite sides of the workpiece set, normally comprising a sheet S of fine mesh wire screen such as a Fourdrinier screen and a patch P of relatively coarse mesh, undersize wire to be welded thereto to cover and thereby repair a damaged area or hole in the sheet S. For example, where the sheet S is 75 mesh screen, the patch P is preferably about 50 mesh screen. The electrode 15 is formed as a flat plate which underlies and contacts the lower screen, here the sheet S of the workpiece set. The electrode 14 is supported by a handle H for axial movement into firm contact with the workpiece set on the side thereof opposite the electrode 15 at points to be welded.

The electrical circuitry 12 (FIG. 4) is energized by an electrical source, here a conventional fixed frequency AC source in or near the range 105–120 volts, connected across the input terminals L—1 and L—2 by any convenient means, preferably including a power switch (not shown).

The electrical circuitry 12 includes a DC power supply 17' having a reference potential line 18 connected to the terminal L—1. The power supply 17 provides a positive low voltage DC output, for example 3.9 volts, on line 21, and a higher positive DC output, for example 27 volts, on line 22. A diode rectifier 24 has its anode connected to the terminal L—2 and its cathode connected through parallel resistors 26 and 27 to the low and high positive potential lines 21 and 22, respectively. Capacitors 28 and 29 connect the positive potential lines 21 and 22 to the reference line 18. The resistance 26 and capacitor 28 forms an R-C filter for smoothing the ripple content, and reducing the DC voltage applied by the diode 24 to the low positive potential line 21. The resistor 27 and capacitor 29 form a similar R-C filter and voltage reducing circuit for the high positive potential line 22. Zener diodes 31 and 32 parallel the capacitors 21 and 29, respectively, having their anode ends connected to the reference potential line 18 and act as voltage regulators limiting the maximum voltage appearing on the low and high positive potential lines 21 and 22, respectively.

The electrical circuitry 12 further includes a clock circuit 36 comprising a phase shift unit 37 and a Schmidt trigger unit 38, the clock circuit producing clock signals in synchronism with the AC waveform at terminals L—1 and L—2. The phase shift unit 37 includes a transformer 41 of the voltage stepdown type having a primary winding 42 connected across the AC source terminals L—1 and L—2 and a centertapped secondary winding 43. In the particular embodiment shown, the voltage appearing across the secondary winding is approximately 6 volts AC. The centertap 44 of secondary winding 43 connects to the reference potential line 18. A capacitance, here comprising a pair of capacitors 46 and 47 in series, connects across the secondary winding 43 to form a tuned LC circuit therewith for the purpose of removing transients from the AC voltage appearing across the secondary 43. An adjustable resistor 49 and capacitor 50 connect in series across the secondary winding 43 and define a phase shift circuit, output from which is taken on a line 52 connected to the junction point of the resistor 49 and capacitor 50. Thus, a low AC voltage appears on line 52 which is shifted in phase by a preselected amount determined by the adjustment of resistor 49 from the phase of the AC source wave form appearing across terminals L—1 and L—2. More particularly, the beginning of the positive half wave appearing on the line 52 will occur simultaneously with some point following the beginning of and during the positive half wave of the AC source connected to terminals L—1 and L—2.

The Schmidt trigger unit 38 comprises a pair of NOR gates 55 and 56. The NOR gates 55 and 56 may be purchased from commercial sources as a single unit 57 and are so represented in the drawings. Power connections for the unit 57 include connection by a line 73 to the low positive potential line 21 and connection through a bias resistor 65 to the reference potential line 18. The internal construction of NOR's 55 and 56 and power connections within the unit 57 to the NOR's are conventional and need not be described. Each of the NOR gates 55 and 56 is provided with a pair of input lines and an output line. More particularly then, input line 58 of NOR gate 55 connects through a dropping resistor 59, provided to limit the voltage appearing upon the input 58, to the phase shift line 52. A parallelled capacitor 61 and resistor 62 connect between the input 58 and reference line 18 and in cooperation with the dropping resistor 59 filter out high frequency transients from the signal applied to the input 58. The other input 63 of NOR 55 connects through a line 64 and the bias resistor 65 to the reference potential line 18.

Therefore, a low potential, somewhat above the reference potential due to current flow through the bias resistor 65 but still corresponding to a logical "0" condition, is applied to the input 63 and phase shifted alternating voltage of substantially sinusoidal waveform is applied by the phase shift line 52 to the input 58 of NOR 55. Thus, the output of NOR 55 is, during negative and portions of positive half cycles of the AC source, a logical "1", condition, is applied the input 63 being a logical "0" and the input 58 during such time also being at a logical "0." However, when the phase shifted waveform appearing at the input 58 rises beyond zero to a preselected positive level, the NOR 55 switches its output to a logical "0" condition and such is applied to its output line 66. Thus, the NOR 55 will switch at some point after the waveform on line 58 swings positive, e.g., 10° to 18° later. However, the amount of delay is the same for every cycle of the waveform on line 58 and simply adds to the lag caused by the R-C circuit 49, 50 to determine the total phase shift of the circuit 12.

The NOR 56 is intended to assist and make more rapid and decisive the switching of the NOR 55 so as to produce from the sinusoidal input at line 58 a short rise time squarewave output on line 66. More particularly, one input 68 of NOR 56 connects to the reference potential line 18 and is held thereby at a logical "0" condition. The other input 69 of NOR 56 connects to the output line 66 of NOR 55 and is thus normally at a logical "1" condition with line 66 and upon switching of the NOR 55 goes to a logical "0" condition with line 66. The output line 70 of NOR 56 connects through a resistor 71 to the low positive potential line 21. Thus, the NOR 56 normally has a logical "0" input on line 68 and a logical "1" input on line 69 producing a logical "0" output on line 70 tending to cause current flow from the low positive potential line 21 through dropping resistor 71 which necessarily increases current flow through bias resistor 65 and hence maintains the input 63 of NOR 55 above reference potential. However, when the NOR 55 switches, producing a logical "0" on its output line 66 and hence on the input 69 of NOR 56, both inputs of NOR 56 are then at logical "0." In consequence, NOR 56 carries out an AND function by responding to the similarity of its inputs to produce a changed output on line 70, namely a logical "1" condition. In consequence, no further current is drawn through the resistor 71, current flow through bias resistor 65 drops and in consequence the potential on input 63 of NOR 55 drops. This increases the switching rate of NOR 55 and hence decreases the fall time of the potential drop on output line 66, producing a steep wavefront, useable as a clock signal by devices such as J-K flip-flops.

A normally open switch 75 is connected at one side thereof to the reference potential line 18 for purposes appearing hereinafter. A capacitor 76 is connected across the switch 75 for reducing voltage transients which may result from opening and closing of the switch. The switch 75 is actuated by means associated with the handle H and electrode 14 as above-mentioned and as hereinafter described in more detail.

The bistable unit or switching circuit generally indicated at 80 is provided for producing a preselected number of pulses, in the particular embodiment shown one or two, during the period in which the switch 75 is closed and at the time of corresponding clock signals from the output line 66 of the clock circuit 36. The switching circuit 80 includes a pair of multivibrators, preferably J-K flip-flops 82 and 83. The flip-flops 82 and 83 of the preferred embodiment shown are available commercially as a single package or unit as indicated in broken lines at 84. Conventional operating voltage connections are made to the unit 84 from the low positive potential line 21 and reference line 18 as generally indicated at 86 and 87, respectively. Operating voltage connections from the lines 86 and 87 are made internally of the unit 84 to the individual J-K flip-flops 82 and 83 in a conventional manner (not shown).

Although multivibrators having other polarities at various inputs and outputs may be used, with suitable circuit changes to adapt to such different polarities, the J-K flip-flops 82 and 83 in the preferred embodiment shown, are of a type switchable upon application of a negative going clock pulse or spike thereto. The flip-flops 82 and 83 have set inputs S—1 and 0—2, respectively, reset or clear inputs C—1 and C—2, respectively, clock inputs T—1 and T—2, respectively, direct set inputs P—1 and P—2, respectively, outputs J—1 and J—2, respectively, and complemental outputs K—1 and K—2, respectively. The flip-flops 82 and 83 shown are of the type which will toggle when both inputs S and C thereof are at a logical "0" or reference potential upon application of a negative going clock spike to the T input thereof, such toggling reversing the outputs on the J and K terminals thereof. Further, upon appearance of a negative clock spike at the T input and where the S and C inputs have different logical quantities appearing thereat (that is, one has a logical "0" and the other a logical "1" thereon), a flip-flop will toggle if necessary and remain in such toggled position as to produce different logical quantities at the outputs J and K, the logical quantity appearing at output J corresponding to the logical quantity at input S and hence the logical quantity at output K corresponding to that at input C. If both inputs S and C are at a logical "1" at the time of occurance of a negative clock spike, the outputs J and K undergo no change. The above characteristics are summarized in the following Table I.

TABLE I

| Inputs | | | Outputs | |
|---|---|---|---|---|
| S | T | C | J | K |
| 0 | clock | 0 | C | C |
| 1 | clock | 0 | 1 | 0 |
| 0 | clock | 1 | 0 | 1 |
| 1 | clock | 1 | NC | NC |

In the above Table I the letter "C" indicates that the particular output indicated undergoes a change and the letters "NC" indicate that the output undergoes no change. In addition, the character of the particular preferred flip-flops 82 and 83 is such that a logical "1" at the P input unconditionally sets the flip-flop, that is, sets same to produce an output at J of a logical "0" and at K of a logical "1."

Turning now to the incorporation of the flip-flops 82 and 83 into the electrical circuitry 12, the output line 66 of the clock circuit 36 connects through a capacitor 91 to the T—1 and T—2 clock inputs of the flip-flops 82 and 83. A diode 92 parallels the capacitor 91, the anode of the diode 92 connecting to the clock output line 66. The capacitor 91 produces a negative-going clock spike to be applied to the clock inputs T—1 and T—2 of the flip-flops. The capacitor 91 tends to eliminate any surge interference with the square waveform emmanating from the Schmidt trigger unit 38 on line 66. The diode 92 is provided to maintain the stability of the voltage applied to the clock inputs T—1 and T—2 and to inhibit positive-going spikes which the capacitor 91 would otherwise tend to produce when the squarewave output on line 66 swings in a positive direction.

Considering the further inputs to flip-flop 82, the S—1 input thereof is connected through the line 95 to the reference potential line 18 for continuously maintaining a logical "0" at the S—1 input. The C—1 input of flip-flop 82 connects through a resistor 96 to the low positive potential line 21 and through a line 97 to the free end of the aforementioned switch 75. Thus, input C—1 is normally maintained at a positive potential through the resistor 96 (that is, at a logical "1") but upon closure of the switch 75, input C—1 drops in potential to substantially that of the reference potential line 18 which changes the input C—1 to a logical "0."

Turning now to the remaining inputs of the further flip-flop 83, the S—2 input thereof connects through a resistor 98 to the low positive potential line 21 for maintaining a logical "1" condition thereon. The C—2 input connects through a line 99 13 1 output of the first-mentioned flip-flop 82 for applying the signal appearing on output K—1 to input C—2.

The direct set input P—1 of the flip-flop 82 connects through a line 101 to the output J—2 of the further flip-flop 83. The direct set input P—2 of flip-flop 83 connects through a line 102 to the C—1 input of flip-flop 82 and thereby to the resistor 96 and switch 75. Thus, the same logical conditions appearing on input C—1 will appear on direct set input P—2.

The outputs of the flip-flops 82 and 83 are taken from the J—1 and J—2 terminals thereof, respectively, and applied to capacitors 103 and 104, respectively. The capacitors 103 and 104 produce positive or negative going pulses in response to positive or negative going wavefronts appearing on terminals J—1 and J—2, respectively, and apply such pulses to input lines 105 and 106, respectively, of a lock-out circuit 110. Resistors 107 and 108 connect from the input lines 105 and 106, respectively, to the reference potential line 18. The resulting R-C circuits 103, 107 and 104,108 stabilize input voltages to the lock-out circuit 110 and, more particularly, prevent a spurious build-up of input voltage on the inputs thereto. A switch 109 connects the input line 106 to the reference potential line 18. The switch 109 when closed shunts the line 106 to reference potential so that no pulse from capacitor 104 reaches the lock-out circuit 10. The effect, as hereinafter discussed, of closure of the switch 109 is that only one and not two cycles of weld current be applied to the workpiece comprising the screen S and patch P.

The lock-out circuit 110 is provided to prevent weld current flow when the resistance at the weld position is excessive, for example, when the electrodes 14 and 15 are not applied to the workpiece (the screen S and patch P) with a sufficient and predetermined pressure. The lock-out circuit 110 also sequentially passes outputs from the switching circuit 80, providing isolation between the output points J—1 and J—2 thereof.

The lock-out circuit 110 includes a pair of NOR gates 112 and 113. The lock-out device 110, including NOR gates 112 and 113, is purchasable as a commercial unit 114 which, in the particular embodiment shown is preferably identical to the commercial unit 57 utilized for the Schmidt trigger device 38. Operating potential is applied to the unit 114 through lines 115 and 116 connected respectively to the low positive potential line 21 and the reference potential line 18, the connections internally of the unit 114 to the NOR gates 112 and 113 from the lines 115 and 116 being conventional and not being shown.

The inputs of NOR gate 112 are connected to the input lines 105 and 106 above described. The output of NOR gate 112 is applied through a line 120 to one input of NOR gate 113. The other input of NOR gate 113 is connected through a line 121 to means hereinafter described for preventing output from the lock-out device 110 in the event that weld contact resistance is excessive, as for example when the weld electrode 14 is not in contact with the workpiece although the switch 75 is closed. The output of NOR gate 113 is the output of the lock-out device 110 and is applied to an output line 122.

The NOR gate 112 is arranged to perform an OR function and more particularly in response to a logical "1" on either of the input lines 105 or 106 thereto, same will provide a logical "0" output on its output line 120 connected to one input of the NOR gate 113. The resistors 107 and 108 normally hold the inputs 105 and 106, respectively, of the NOR gate 112 at a logical "0." A positive going square wave from the outputs J—1 and J—2 of flip-flops 82 and 83, respectively, as such flip-flops toggle in sequence, causes a logical "1" to appear on input 105 and, one cycle later, on input 106 of the NOR gate 112.

The NOR gate 113, on the other hand, is arranged to perform an AND function and more particularly to act as a negated input AND gate. More particularly, the gate 113 will provide a logical "1" output only when both inputs thereof (connected to lines 120 and 121) are at a logical "0." The output of gate 113 will be a logical "0" for any other input condition thereof, that is, when one or both of the inputs thereof are at a logical one.

A trigger circuit 126 comprises a trigger device, here unijunction transistor 127 having an upper base (base-two) connected through a resistor 128 to the high positive potential line 22 and a lower base (base-one) connected through a resistor 129 to the reference potential line 18, the resistors 128 and 129 providing operating bias to the bases of the unijunction 127. Bias voltage is applied to the emitter of the unijunction 127 through a resistor 131 connected to an intermediate point on a voltage divider comprising resistors 132 and 133, the resistors 132 and 133 being connected in series from the high positive potential line 22 to the reference line 18. The resistor 131 tends to stabilize the emitter voltage of unijunction 127. The resistor 133 is parallelled by a capacitor 134 and the resistor 131 is parallelled by a diode 136, the cathode of which connects to the emitter of unijunction 127. The output line 122 of the lock-out unit 110 connects through a capacitor 138 and a line 139 in series therewith to the emitter of unijunction 127 so that as a logical "1" output appears on the line 122, the capacitor 138 couples same as a positive-going spike, here of about 3 volts, to the emitter of the unijunction 127. The diode 136 prevents the aforementioned positive spike from being shunted to the reference line 18 by the capacitor 134 while allowing the capacitor 134 to discharge through the unijunction 127 when it fires. The capacitor 134 is normally charged to a level intermediate the high positive potential line 22 and reference line 18, here to approximately 17 volts positive, through the resistor 132.

Output is taken from the trigger circuit 26 by a line 141 connected to the lower base of the unijunction 127. Thus, upon firing of the unijunction 127, a positive spike, termed a trigger pulse, appears across the bias resistor 129 and on the line 141.

The trigger pulse output on line 141 is applied to a firing circuit generally indicated at 145. The firing circuit 145 comprises a firing loop 146 consisting of a line 147 connected to the alternating current supply terminal L—2, the primary winding 148 of the welding transformer 13, a further line 149, the anode and cathode of a triggered solid state power switch, here an SCR 151, and the reference line 18 which in turn is connected to the AC supply terminal L—1. The gate of SCR 151 is connected to the trigger line 141. A voltage regulator device 152, here a surge surpressor, and a parallel resistor 153 are connected across the SCR 151 and between the lines 149 and 18. The surge surpressor 152 prevents high voltage transients from destroying the SCR 151. The resistor 153 is a bleed resistor and allows continuous passage of a small amount of current from the AC source connected to the terminals L—1 and L—2 through the welding transformer 13 for purposes appearing hereinafter.

Thus, upon the appearance of a trigger pulse on line 141, concurrent with terminal L—2 being positive with respect to terminal L—1, the SCR 151 fires and continues to conduct for the remainder of the half cycle of the AC source, such half cycle being termed the positive half cycle of the AC source. Current conducted through the SCR 151 passes through the primary winding 148 of the welding transformer 13 and causes a corresponding partial half cycle of current flow through the secondary winding 154 and weld electrodes 14 and 15 connected thereacross. Thus, said partial half cycle of weld current passes through the workpiece causing opposed areas of the patch P and screen S to be welded together.

A current meter 150 is connected in series between portions of the line 147 and is shunted, for protective purposes, by a low resistance conductor 150A.

A weld contact resistance or pressure sensing circuit 158 is provided for controlling the potential on the aforementioned line 121 connected to the lock-out device 110 for indicating whether or not proper weld contact resistance exists and further to indicate whether of not the electrodes have been applied to the workpiece at all. The sensing circuit 158 is also a safeguard to prevent improper setting of the phase shift resistor 49 during setup of the circuit 12.

The sensing circuit 158 includes an isolation transformer 161 having a primary winding 162 connected across the primary winding 148 of the weld transformer 13 and a secondary winding 163. One side of the secondary winding 163 connects through a line 166 to the reference potential line 18 and the other side of the secondary winding 163 connects through a series resistor 170 and Zener diode 171 also to the reference potential line 18, the anode end of the Zener being connected to the reference potential line 18 for limiting the voltage generated across the secondary winding 163 in response to current flow through the loop 146. A capacitor 168 connects across the Zener diode 171. A resistor 167 connects the juncture of the capacitor 168 and Zener diode 171 to the output line 121. A voltage regulating device 172, preferably of the same type as the device 152 above-mentioned, is connected across the primary winding 162 for limiting high surge voltages across the primary 162. The Zener 171 shunts therethrough negative voltages applied to the cathode thereof as well as limiting the amplitude of positive going voltages applied to the cathode thereof, to the capacitor 168 and then through resistor 167 to the output line 121. The Zener 171 in the particular embodiment shown limits the voltage drop thereacross to 3.9 volts. When the contact resistance is satisfactorily low, indicating that the electrodes 14 and 15 are in satisfactory contact with the workpiece comprising the patch P and screen S, the impedance across the secondary 154 of the weld transformer 13 is low which in turn results in a low impedance across the primary 148 of the weld transformer and hence in increased current flow therethrough. Thus, the primary winding 148 tends to shunt the primary winding 161 of the isolation transformer 161 and hence reduce current flow through the secondary 163 thereof, thereby dropping the voltage across the resistor 146 and capacitor 168. Thus, the capacitor 168 tends to discharge through the secondary winding 163 causing the voltage on line 121 to drop toward reference potential, in effect placing a logical "0" on the input of NOR 113 connected to the line 121, indicating that the electrodes 14 and 15 are in sufficiently good contact with the workpiece P,S as to enable a proper weld.

The secondary winding 154 of the welding transformer 13 is coupled through conductors 191 and 192 to the welding electrodes 15 and 14, respectively. Conductors 191 and 192 may be relatively long, e.g., 18 feet, to allow repair of defects at any point in a wide Fourdrinier screen.

As stated above, the electrical circuitry 12 is housed within the cabinet structure 11 (FIG. 1). A control knob for the variable resistance 49, the switch 109, the meter 150 and, if desided, a power light 190 connected across terminals L—1 and L—2 are mounted on the front face 193 thereof. A cable 194 houses the portion of the conductors 147 and 149 nearest the primary winding 148 and interconnects the cabinet 11 with the welding transformer 13.

The handle H comprises a hollow hand grip 197. The switch 75 is enclosed by a housing 196 which lies within and is secured to the hand grip 197 by a pair of screws 198 and 199. Conductors 201 and 202 are connected to terminals 203 and 204, respectively, on switch 75 and extend therefrom through conduit 206 to the circuit of FIG. 4. The actuating lever 207 for switch 75 projects through an appropriately aligned opening in the upper surface of the housing 196.

A conductive lever arm 211 extends substantially longitudinally from one end (the leftward end as seen in FIG. 3) of the handle H. The electrode 14 comprises a welding rod which extends downwardly from the lever arm 211 at its leftward end and is secured thereto by any convenient means, here nuts 210. The lever arm 211 is supported for pivotal movement in the plane which it defines with the electrode 14 by a pin 212. The pin 212 is located intermediate the ends of the lever arm 211 and is supported transversely within the hand grip 197 adjacent the leftward end thereof. A coil spring 213 is located beneath and bears against the underside 214 of the lever arm 211 to the right of the pivot pin 212. The spring 213 is located with respect to the lever arm 211 by a peg 215 pendant from the lever arm. The lower end of the spring 213 bears against the floor 216 of the hollow hand grip 197 and urges the interior end of the lever arm upwardly.

A leaf spring 217 is secured to the upper surface of the lever arm 211 by a pair of screws 218 and extends rightwardly therefrom to overlie the actuating lever 207 of switch 75.

The weld current conductor 192 is terminated in a lug 221. A conductive block 222 is fixed within the hand grip 197 by any convenient means, not shown, and the lug 221 is suitably secured thereto. A flexible conductor 223 extends between the conductive block 222 and the leftward end of the conductive lever arm 211, being secured thereto by screws 224 and 226, respectively, for completing the weld current flow path from the conductor 192 to the electrode 14.

OPERATION

Preparatory to welding, the sheet S or wire mesh screen to be repaired is covered at a defect or hole therein, not shown, with the patch P, the patch P overlapping the hole in the sheet S around the margin thereof to allow wleding of the patch to the sheet. The apparatus 10 above mentioned is capable of welding screens of very fine wire size, for example Fourdrinier screens having wires approximately 0.007 inch in diameter.

Conveniently, the patch is laid on top of the sheet S and the stationary electrode placed below and in supporting relation to the sheet S as indicated in FIG. 1. As discussed hereinafter in more detail, welding is carried out, with the weld transformer 13 energized as hereinafter discussed, by placing the electrode 14 above the patch P and urging the free end of the electrode 14 toward the electrode 15 and against the patch P to effect a welded connection between patch and sheet. By repositioning the electrode 14 around the perimeter of the patch, the patch P can be welded to the sheet S in a manner to lock same mechanically thereto and to limit fluid to flow through the mesh of the patch or screen by preventing fluid flow between the patch and screen.

Thus, when it is desired to effect a weld, the operator manually grips the hand grip 197 and therewith urges the free end of the electrode 14 against the point on the workpiece set to be welded. As the end of the electrode 14 contacts the workpiece and is urged forceably thereagainst, the electrode 14 and lever arm 211 are pivoted in a clockwise direction with respect to the hand grip 197, as indicated in FIG. 3 by the broken lines, such pivotal movement compressing spring 213. The resulting downward movement of the rightward end of lever arm 211 causes the leaf spring 217 to urge the switch actuator 207 downwardly to close the switch 75 thereby connecting conductors 201 and 202.

Considering, more particularly, the operation of the electrical circuitry of FIG. 4, same is energized by connection of the terminals L—1 and L—2 to a suitable source of AC potential (not shown), preferably through suitable switch means (not shown). With the energization of the terminals L—1 and L—2, the diode 24 and filter sections 26, 28 and 27, 29 provide DC operating potential on the low positive potential line 21 and high positive potential line 22, the Zeners 31 and 32 being used as voltage regulators to maintain a constant output on the lines 21 and 22.

Also with the energization of the terminals L—1 and L—2, a small amount of alternating current is allowed to bleed from the terminal L—2 through line 147 and the parallelled primary windings 148 and 162 by the resistor 153 which is connected through the reference potential line 18 to the other terminal L—1. This small bleed of current occurs despite non-conduction of the SCR 151. When there is excessive resistance between the weld electrodes 14 and 15, the weld transformer primary 148 is at a high impedance and most of the current flow through the resistor 153 takes place through the primary 162 of sensing transformer 161. Thus, the secondary 163 charges the capacitor 168 to its maximum level holding the line 121 at a high or logical "1" level. Conversely, proper contact between the weld electrodes and the workpiece causes a relatively low impedence in the weld transformer primary winding 148, shunting current flow away from the primary 162 of the sensing transformer 161, allowing the capacitor 168 to discharge to a lower level and dropping the potential on the line 121 to in effect place a logical "0" thereon.

The weld contact pressure sensing circuit 158 above discussed has several functions and such functions may be more readily understood by noting the following considerations. The apparatus 10 embodying the invention may be termed a resistance welder or spot welder in which weld heat $W$ is generated in accordance with the relation $W=I^2r$ by current $I$ flowing through the resistance $r$ at the point of contact between the knuckles of the screen wires and those of the covering patch P. Because of the very low thermal capacity of the join of the adjacent patch and screen wire knuckles, it is necessary for the weld current to be precisely controlled and applied over a short time interval such as one one-hundred-twentieth of a second, for example, during a half cycle of a standard 60-cycle alternating power source.

The energy produced at the secondary winding of the weld transformer 13 is divided between a portion dissipated by the cables 191 and 192 due to the IR drop therein and the remaining portion dissipated at the weld. Further, the energy dissipated in the cables and at the weld position is directly proportional to their relative resistances. The welding apparatus 10 described herein is provided with relatively long cables 191 and 192. These long cables are necessitated by the need to reach both sides of a relatively wide Fourdrinier wire screen. Such long cables have appreciable resistance and normally dissipate a large part of the energy output of the weld transformer 13 during current flow therealong. This loss is compensated for by providing adequate voltage, here approximately 12 volts AC, at the weld transformer secondary 154 to overcome the IR drop in the cables 191 and 192 and thereby normally maintain adequate and correct current flow at the welding position and through the adjoining knuckles of the patch and screen wires.

However, should for any reason the resistance at the weld position be unusually high (for example, 10 times the normal amount) then an excessive amount of energy (possibly eight times the normal welding energy) would be dissapated at the weld, since energy normally lost in the cables 191 and 192 under normal welding conditions is, under the condition of a high contact resistance at the weld position, now concentrated at the weld, resulting in weld failure and burning of screen and patch wires.

On the other hand, a spurious high resistance condition at the weld electrodes during the setting up of the apparatus 10 for welding would tend to reduce the amount of current flow through the welding transformer 13. In consequence, the operator setting up the circuit, noting insufficient current flow through the current meter 150, would tend to excessively increase the duration of the welding pulse by adjusting the resistor 49. Thus, upon making a weld, given proper contact between the weld electrodes 14 and 15 and the workpiece, excessive energy would be applied at the weld position and the adjoining wire knuckles of the patch and screen would be overheated tending to burn same up or at least not produce a proper weld.

The contact pressure sensing circuit 158, however, is caused in the manner above described, to maintain a logical "1" on its output line 121 whenever there is a high resistance condition at the weld electrodes 14 and 15 which prevents the lock-out circuit 110 from energizing the trigger circuit 126 and hence prevents energization of the firing circuit 145.

Thus, the occurance of a spurious high resistance situation at the weld position during setup will prevent current flow through the SCR 151. The operator can immediately note from the meter 150 such absence of current flow despite adjustment of the phase shift resistor 49 and thereby will be put on notice of a spurious high electrode resistance condition. In consequence, occurance of a spurious high electrode contact resistance during setup will not lead the operator to make an erroneous setting of the phase shift resistor 49 and thereby cause the circuit to generate excessive weld heat during later welding.

On the other hand, should the electrical circuitry 12 be properly set up and a spuriously high weld contact resistance at the electrodes 14 and 15 occur later during welding, the pressure sensing circuit 158 will again sense the high contact resistance and thereby cause a logical "1" to appear on line 121, preventing the lock-out circuit 110 from energizing the trigger circuit 126 and thereby preventing further weld current flow. Again the operator is appraised of the fact that something is wrong by visually noting that a weld has not been made or by noting the absence of weld current flow from viewing the meter 150.

Assuming the electrical circuitry 12 to be properly set up, that is, that the proper adjustment of the phase shift resistor 49 has been made, and that the weld electrodes 14 and 15 have been placed in contact with the workpiece comprising the patch P and screen S as above described, alternating current from the terminals L—1 and L—2 is applied to the transformer 36 and thence across the phase shift circuitry comprising the adjustable resistor 49 and capacitor 50. In consequence, a phase shifted, relatively low alternating voltage (about 6 volts in the present embodiment) is applied through the resistor 59 to the input 58 of NOR 55 of the Schmidt trigger 38. Due to the dropping resistor 59, the alternating potential appearing on the input 58 is approximately 3 volts in the present embodiment, placing same in the operating range of the particular NOR 55 utilized.

The function of the Schmidt trigger 38 is to produce essentially a squarewave output from the substantially sinusoidal voltage applied to the input 58. As the alternating voltage applied to input 58 passes through a negative half cycle and swings positive it will eventually reach a positive voltage whereat the NOR 55 will see the input as a logical "1". Since the input 63 of NOR 55 is normally held somewhat above reference potential by normal current flow through the resistor 65, but still at a level corresponding to a logical "0," appearance of a logical "1" at the input 58 causes the NOR 55 to switch, dropping its output line 66 from a prior logical "1" condition to a logical "0" condition.

As discussed above, the provision of the additional NOR 56 speeds the switching of the NOR 55, the NOR 55 thus switching very quickly, in approximately 1 microsecond, to the logical "0" output condition. Thus, there is provided a rapid rise time as required for properly actuating the J-K flip-flops 82 and 83.

The negative going waveform occasioned by the aforementioned switching of NOR 55, appearing on line 56, is blocked by diode 92 but passed by capacitor 91 in the form of a fast rise time, negative going spike or clock pulse which is applied to the clock inputs T—1 and T—2 of the flip-flops 82 and 83.

Thus, clock pulses are applied to the T inputs of the flip-flops 82 and 83 at a selected time, determined by the setting of the variable resistor 49, in each positive half cycle of the AC supply connected to terminals L—1 and L—2. These clock pulses occur at the time in the positive half cycle at which weld current flow is to be initiated in such half cycles. However, it is the function of the switch 75, when actuated by relative movement of the handle 197 and electrode 14, to determine the positive half cycle or half cycles in which weld current will flow. Weld current flow does not start at the instant that the switch 75 is closed but rather at the next occurrence of preselected point in a positive AC source half cycle, in order to assure that a precisely controlled, preselected amount of heat will be applied to the workpiece during each weld. Thus, it is the function of the flip-flops 82 and 83 to respond both to the clock pulses appearing at inputs T—1 and T—2 outputs and to the closure of switch 75 to produce an output pulse at each point in time at which weld current is to begin flowing.

Turning then to the flip-flop 82, input S—1 is continually maintained at a logical "0" through connection to the reference potential line 18. Further, input C—1 is at rest maintained at a logical "1" due to connection through resistor 96 to the positive potential line 21 so that the outputs J—1 and K—1 are a logical "0" and "1," respectively.

Input C—1 falls to a logical "0" condition upon closure of the switch 75, due to connection thereto through the line 97. Thus, upon occurrence of the first negative going clock pulse on the input T—1 following such closure of the switch 75, the flip-flop 82 will toggle or switch out of its rest state, placing a logical "1" on the J—1 output and a logical "0" on the K—1 output thereof. The appearance of the logical "1" on the J—1 output causes a positive going spike to be applied by capacitor 103 to input line 105 of NOR 112 of the lock-out circuit 110 for purposes appearing hereinafter.

Considering flip-flop 83, input S-2 thereof is continuously maintained at a logical "1" by connection through the resistor 98 to the positive potential line 21. At rest, input C—2 is at a logical "1" due to connection to output K—1 of flip-flop 82. Also, direct set input P—2 is held at a logical "1" with input C—2 of flip-flop 82 due to the open condition of switch 75.

On closure of the switch 75, the direct set input P—2 assumes a logical "0" condition and this can no longer prevent toggling of the flip-flop 83. Despite this and although the above-mentioned first clock pulse is applied thereto, the flip-flop 83 does not toggle in response to the above-mentioned first clock pulse. Flip-flop 83 will not toggle when both inputs S—2 and C—2 are at logical "1."

The second flip-flop 83 thus does not so toggle because of the logical "1" applied to the S—2 input thereof through resistor 98 and to the input C—2 thereof by the pre-existing output on the K—1 terminal of flip-flop 82. However, after the flip-flop 82 has toggled as above discussed, the logical "0" then appearing on the K—1 output of the flip-flop 82 is applied to the C—2 input of flip-flop 83. In consequence, flip-flop 83 is enabled to toggle thereafter in response to the second clock pulse occurring after closure of the switch 75 and while the switch 75 is closed.

Said second clock pulse cannot change the state of the flip-flop 82 since the inputs S—1 and C—1 thereof remain unchanged. On the other hand, the second clock pulse, that is, the next appearing clock pulse after the aforementioned toggling of the flip-flop 82, causes the flip-flop 83 to toggle in accordance with its S—2 and C—2 inputs (logical "1" and "0," respectively) whereby a logical "1" appears on the J—2 output thereof, the wavefront thereof being passed as a positive going spike by capacitor 104 to the input 106 of NOR 112.

The logical "1" now appearing on output J—2 is also applied through line 101 to the direct set input P—1 of flip-flop 82, overriding the S—1 and C—1 inputs thereof and switching same to a set condition which returns the outputs J—1 and K—1 to their respective, rest or logical "0" and "1" conditions. Thus, further (third, fourth, etc.) clock pulses cannot change the condition of flip-flop 82 while the switch 75 remains closed or when it thereafter opens.

After so setting the flip-flop 82 and thereby re-establishing a logical "1" at output K—1, the flip-flop 83 carries a logical "1" at both inputs S—2 and C—2. Thus, later (third, fourth, etc.) clock pulses will not toggle the flip-flop 83. Thus, after producing the second positive going pulse which appears on line 106, the flip-flops 82 and 83 both assume states wherein further clock pulses will effect no change in the outputs thereof and thus no further inputs will be made to the lock-out unit 110. The flip-flops 82 and 83 will remain in this condition until the switch 75 opens. Thus, until the switch 75 opens and again closes no more pulses can be produced at the inputs of the lock-out circuit 110 and no more welding pulses can be produced at the electrodes 14 and 15. In consequence, it is immaterial how long the operator, pressing down on the handle 197, holds electrode 14 in contact with the workpiece after having completed the weld since no extra, unintended weld current pulses will flow by reason of such continued contact.

Thus, in the particular embodiment shown, the flip-flop unit 84 produces two positive going pulses, applying the first to line 105 and the second to line 106, the two pulses being located precisely one full cycle of the AC supply apart and each occurring at a precisely determined time in a positive half cycle of the AC source, that is, at the time of a clock pulse and therefore at the phase point selected by the phase shift circuit 49, 50.

When the wires of the screen S and patch P are relatively fine, it is desirable that only one pulse of weld current be applied thereto and that this pulse be a relatively short one to minimize heat transfer along the wires to other positions in the grid work of the patch and screen, which might cause structural damage to the patch and/or screen. In such a situation, the second pulse from the flip-flop unit 84 can be suppressed, that is, not applied to NOR 112, and this can be done by closure of the switch 109 connecting the line 106 to the reference potential line 18, thus holding the lower input of the NOR 112 at a logical "0" despite the positive swing of the output J—2. On the other hand, when relatively heavy wire is used in the screen and patch, it may be desirable to utilize more than one weld current pulse per weld and in such case, in the particular embodiment shown, two pulses of weld current may be supplied by allowing the switch 109 to remain open.

It is contemplated that the circuit disclosed in FIG. 4 may be modified to allow a quantity of weld current pulses per weld in excess of two. Such may be carried out by provision of additional flip-flops in the unit 84 and additional inputs for NOR 112. However, such is not the preferred arrangement of the present invention, since, in view of the unidirectional firing circuit 145 used, the weld transformer 13 may begin to saturate after three or more unidirectional weld pulses with possible degradation of weld heat supplied by such later pulses. Moreover, such multipulse welding is unsuitable for fine mesh screen such as Fourdrinier screen, for which the apparatus of the present invention is particularly intended, since excessive heat would be applied to the screen for an excessive time, with at least a substantial risk of screen damage.

The output of NOR 112 is normally a logical "1." Application of a positive pulse or logical "1" to either of the inputs 105 or 106 thereof causes a logical "0" to appear at the output thereof which is transferred by the line 120 to the upper input of gate 113. NOR gate 113 is arranged to provide an AND function or, more particularly, to operate as a negated input AND gate. The output of gate 113 is normally a logical "0" and it will remain same unless both inputs of gate 113 carry a logical "0."

The lower input of gate 113, connected by line 121 to the pressure sensing circuit 158 above described, will carry a logical "1" if insufficient pressure is established between the electrodes and workpiece, or more particularly if the contact resistance between the electrodes and workpiece is too high. This includes the situation in which the handle 197 is manipulated to spuriously close the switch 75, for example, by reason of the electrode 14 contacting something other than the workpiece or stationary electrode 15. The logical "1" thus appearing at the lower input of gate 113 precludes switching thereof despite the condition of the upper input thereof and hence despite the condition of the output of NOR gate 112. Thus, as long as there is a logical "1" on the lower input of gate 113, positive going pulses applied to lines 105 and 106 by the flip-flop unit 84 cannot cause a positive going output on the output line 122 of lock-out unit 110.

On the other hand, if the proper, relatively low resistance condition exists between the electrodes 14 and 15, the sensing circuit 158 applies a logical "0" through line 121 to the lower input of gate 113 so that upon application of a logical "0" to the upper input thereof, due to the above-described appearance of a positive pulse on line 105 or line 106, the gate 113 will switch and provide a logical "1" on its output line 122.

The onset of the logical "1" output on line 122 is passed in the form of a positive going spike by the capacitor 138 to the emitter of unijunction 127 causing same to conduct the charge of the capacitor 134 therethrough and thereby providing a positive going spike, or trigger pulse, on the trigger output line 141. Such a trigger pulse occurs in synchronism with and substantially concurrently with a corresponding one of the clock pulses applied to the flip-flop unit 84 following closure of the switch 75 and resulting in a change of state of the flip-flop unit 84.

The SCR 151 of the firing circuit 145 will conduct in response to such trigger pulse, conduction taking place from the AC terminal L—2 through the primary 148 of the welding transformer 13. The SCR 151 continues to conduct for the remainder of the half cycle of the AC supply. Thus, the firing circuit 145 provides one, or in the case where the switch 109 is not closed tow, partial positive half cycles of the AC supply voltage to the welding electrodes 14 and 15, the resulting weld current pulse or pulses effecting a weld between the patch P and screen S.

The capacitor 134 charges through the resistor 132 to a level determined by the ratio of the resistors 132 and 133 upon completion of conduction of the unijunction 127 thereby quickly assuming, within less than one cycle of the AC supply a charge condition preparatory to again discharging through the unijunction 127 in response to a positive spike from the lock-out circuit 110.

The operator may continue to hold the welding electrode 14 against the workpiece after completion of the weld without fear of applying additional unwanted quantities of weld current to the workpiece. This is because of the fact that the flip-flops 82 and 83 will not change state after providing the aforementioned first and second positive pulses on lines 105 and 106, until such time as the switch 75 is opened by the operator removing the electrode 14 from the workpiece, allowing a repeat of the welding process above described.

When the operator removes the electrode 14 from the workpiece, the circuitry 12 returns to its rest condition whereat logical "1" appears on the line 121. The switch 75 opens and returns the C—1 input of flip-flop 82 and the direct set input P—2 of flip-flop 83 to a logical "1" condition, setting the flip-flop 83 and causing the J—2 and K—2 outputs thereof to assume logical "0" and "1" conditions, respectively. Thus, the flip-flops 82 and 83 are returned to their rest conditions.

Thus, as the operator upon completion of a weld moves the handle H upwardly away from the workpiece to disengage the electrode 14 therefrom, the resulting release of upward (as seen in FIG. 3) force on the outer end of the lever arm 211 allows the spring 213 to pivot same with respect to the hand grip 197 and in a counter clockwise direction whereby the leaf spring 217 releases the actuator 207 of switch 75. Thereafter, further welds in succession, around the perimeter of patch P, may be effected in the manner above described.

Under normal circumstances, the warp and woof wires of a Fourdrinier screen are arranged to form rectangular openings and the wires in the patch advantageously define square openings. Thus, the intersections or "knuckles" of the patch cannot fall within all of the openings in the screen. However, in order to further minimize such blocking of the openings in the screen by the knuckles of the patch, the wires of the patch are preferably of smaller gauge than, and are arranged approximately at 45° angles to, the wires of the screen. For convenience of illustration, the patch wires are shown as parallel with, and of about the same gauge as, the screen wires in FIG. 2.

The setup of the apparatus 10 preparatory to welding, to achieve a proper length of weld pulse and hence proper weld heat, is carried out by placing the electrode 14 directly and steadily against the electrode 15, using the handle H to force the electrodes together in such a manner as to actuate the switch 75. Thereafter, the circuit operates as it would in making a weld, that is, clock pulses are produced at points in the positive halfwaves of the AC supply determined by the setting of the resistor 49. Such clock pulses are applied to the flip-flop unit 84 which in turn applies one or, if desired, two pulses to the lock-out device 110. The lock-out device 110, assuming the proper contact between the electrodes 14 and 15 for providing a low resistance therebetween, provides a positive pulse to the trigger circuit 126 at the time of each of the pulses on the lines 105 and 106. The trigger circuit 126 fires the unijunction 151 and consequently causes conduction of a partial AC source half cycle through the electrodes 14 and 15. The operator at the time of such conduction determines from the meter 150 whether the amount of energy transferred per pulse is correct and correspondingly adjusts the variable resistor 49 in the desired direction and disengages the electrodes. The operator continues this cyclical process until satisfied by the reading of meter 150 that proper amount of current is being provided to the electrodes, namely that the proper phase lag has been established by the variable resistor 49. Once the resistor 49 is properly set in the above manner, the apparatus 10 can be used for actual welding of a patch P to the screen S.

Although a preferred embodiment of the invention has been disclosed above for purposes of illustration, it will be apparent that modifications and variations of the disclosed apparatus, including the rearrangement of parts, lie within the scope of the present invention.

The embodiments of the invention in which an exclusive property or privilege is claimed are defined as follows:

1. A welding apparatus having welding electrodes energizable from an alternating potential source for welding fine wire screen with a controlled current pulse, comprising in combination:

means for generating periodic clock signals in synchronized relation with said alternating potential source;

switch means actuable in response to positioning of said electrodes enabling weld current flow from said source to said electrodes;

means responsive to said clock signals and actuating of said switch means for producing the preselected number of pulses in synchronism with respective ones of said clock signals;

means actuable for suppressing preselected ones of said pulses;

means responsive to a sufficient pressure of said electrodes against said screen for allowing said pulses to pass therethrough;

said means actuable for suppressing pulses comprising a conductor connected between said means responsive to said clock signals and said means responsive to pressure and a switch connecting between said conductor and source of constant potential of a level corresponding to the absence of a pulse on said conductor whereby closure of said switch said pulse to said potential source;

trigger means responsive to said pulses for producing corresponding trigger pulses;

a firing circuit responsive to each said trigger pulse for producing a portion of a half cycle of weld current flow from said source through said electrodes and screen;

whereby actuation of said switch means causes a quantity of electrical energy to be applied to said screen for welding same, said quantity being determined by the time of occurrence of corresponding ones of said clock signals with respect to the alternating potential wave form of said source.

2. A welding apparatus having welding electrodes energizable from an alternating potential source for welding fine wire screen with a controlled current pulse, comprised in combination:

means for generating periodic clock signals in synchronized relation with said alternating potential source;

switch means actuable in response to positioning of said electrodes enabling weld current flow from said source to said electrodes;

means responsive to said clock signals and actuation of said switch means for producing a preselected number of pulses in synchronism with respective ones of said clock signals;

means actuable for suppressing preselected ones of said pulses;

means responsive to a sufficient pressure of said electrodes against said screen for allowing said pulses to pass therethrough;

trigger means responsive to said pulses for producing corresponding trigger pulses;

said trigger means comprising a unijunction transistor, a storage capacitor and means for charging same, said capacitor being connected through unidirectional means to the emitter of said unijunction transistor and means coupling the pulse output of said pressure responsive means to said emitter in a manner for increasing potential thereon to fire said unijunction transistor and discharge said capacitor therethrough for producing a trigger pulse;

a firing circuit responsive to each said trigger pulse for producing a portion of a half cycle of weld current flow from said source through said electrodes and screen;

whereby actuation of said switch means causes a quantity of electrical energy to be applied to said screen for welding same, said quantity being determined by the time of occurrence of corresponding ones of said clock signals with respect to the alternating potential wave form of said source.

3. A welding apparatus having welding electrodes energizable from an alternating potential source for welding fine wire screen with a controlled current pulse, comprising in combination:

means for generating periodic clock signals in synchronized relation with said alternating potential source;

switch means actuable in response to positioning of said electrodes enabling weld current flow from said source to said electrodes;

means responsive to said clock signals and actuation of said switch means for producing a preselected number of pulses in synchronism with respective ones of said clock signals;

means actuable for suppressing preselected ones of said pulses;

means responsive to a sufficient pressure of said electrodes against said screen for allowing said pulses to pass therethrough;

trigger means responsive to said pulses for producing corresponding trigger pulses;

a welding transformer for supplying weld current to said welding electrodes and in which said pressure responsive means includes sensing means connected across said welding transformer and energizable to an extent related to the impedance of said weld transformer for producing an output condition indicative of whether the impedance of said weld transformer lies below a threshold value indicating proper contact between said electrodes;

gate means interposed between said means for producing said pulses and said trigger means, said gate means being responsive to said output condition of said sensing means for determining whether said pulses will pass form said pulse producing means to said trigger means;

a firing circuit responsive to each said trigger pulse for producing a portion of a half cycle of weld current flow from said source through said electrodes and screen;

whereby actuation of said switch means causes a quantity of electrical energy to be applied to said screen for welding same, said quantity being determined by the time of occurrence of corresponding ones of said clock signals with respect to the alternating potential wave form of said source.

4. The apparatus defined in claim 3, including bleed means for providing a low amplitude current path through said welding transformer which is conductive through said welding transformer in the absence of weld current flow therethrough and wherein said sensing means includes a sensing transformer connected across said welding transformer and responsive to a high impedance condition of said welding transformer for conducting more of said bleed current therethrough and means in circuit with said welding transformer and responsive to current flow therethrough of an amount exceeding the threshold value for changing the output condition of said sensing circuit.

5. The apparatus defined in claim 3, in which said gate means comprises an OR function gate and an AND function gate, the output of said OR function gate being connected to one function gate being connected to one input of said AND function gate, said OR function gate having inputs connected to said pulse producing means, said AND function gate having a further input connected to said sensing means, said OR function gate passing said pulses therethrough, said AND function gate passing said pulses therethrough upon occurrence of an output condition of said sensing means indicating a low impedence condition in said welding transformer, the output of said AND function gate being connected to said trigger means.

* * * * *